INVENTORS.
HAROLD L. DOBRIKIN
CHARLES HOROWITZ
BY Parker & Carter
ATTORNEYS.

United States Patent Office 3,177,779
Patented Apr. 13, 1965

3,177,779
BRAKE ACTUATOR AND LOCKING MEANS THEREFOR
Harold L. Dobrikin, Highland Park, and Charles Horowitz, Chicago, Ill., assignors, by mesne assignments, to Berg Mfg. & Sales Co., Des Plaines, Ill., a corporation of Illinois
Filed Feb. 28, 1963, Ser. No. 261,589
10 Claims. (Cl. 92—19)

This invention relates to brake actuators for truck-trailer vehicle combinations and the like.

One purpose of the invention is to provide a brake actuator operable in one direction to apply the brakes of a vehicle in response to delivery of fluid pressure to said actuator and including means for precluding movement of said actuator in the opposite direction in response to the absence of fluid pressure from a predetermined source or at a given location in said actuator.

Another purpose is to provide an actuator for vehicle brakes operable in one direction to apply the brakes and including means for locking said actuator in said brakes-on position.

Another purpose is to provide a brake actuator of maximum simplicity and including a separable element employable in association with said actuator and effective to lock said actuator in brakes-on configuration.

Another purpose is to provide a locking assembly usable in connection with brake actuators.

Another purpose is to provide a locking assembly which may be employed with brake actuators of varying configurations.

Another purpose is to provide a locking means which may be positioned within a brake actuator housing for engagement with a brake actuating rod therein.

Another purpose is to provide automatic actuator locking means.

Another purpose is to provide a brake actuator and locking means assembly of maximum simplicity and ease in manufacture and assembly as well as one of maximum economy.

Other purposes will appear from time to time during the course of the specification and claims.

The invention is illustrated more or less diagrammatically in the accompanying drawings, wherein.

Like parts are indicated by like numerals throughout the specification and drawings.

Figure 1:
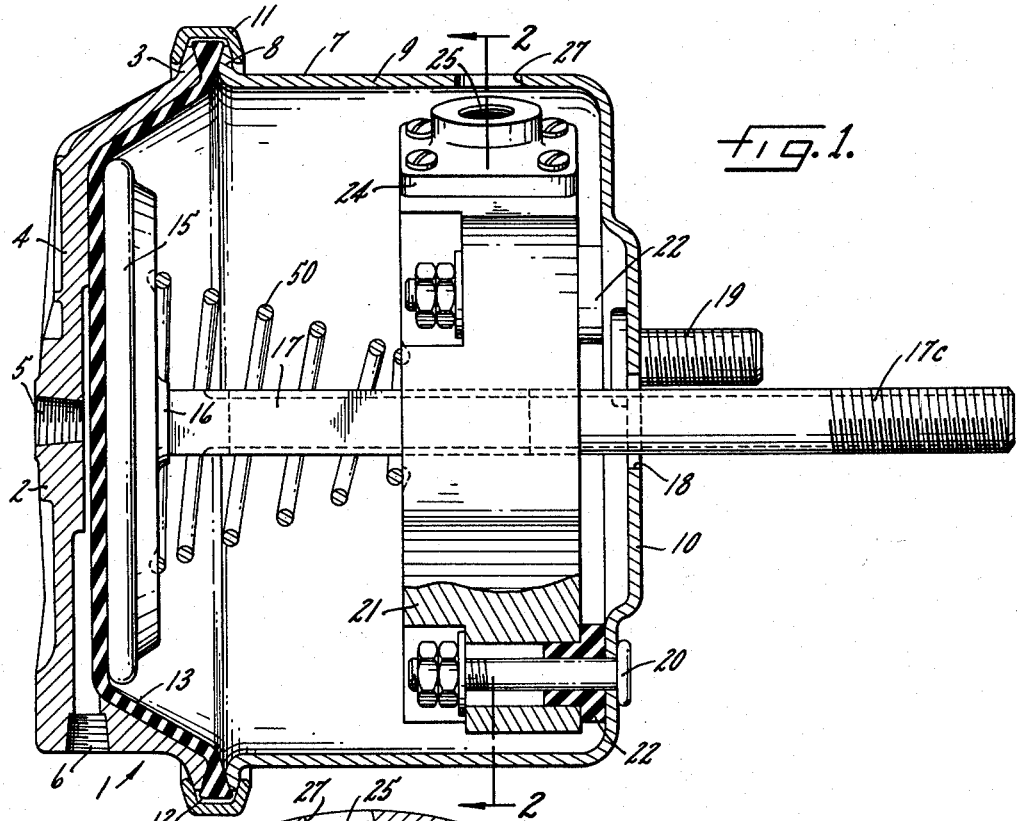
FIGURE 1 is a side elevation with parts in cross section and with parts broken away.

Referring now to the drawings, and particularly to FIGURE 1 thereof, the numeral 1 generally designates a housing. The housing 1 may be formed of a first dish-shaped or shell-like forward housing portion 2 having an annular, outwardly extending flange 3 at its open end and having its end or bottom wall 4 centrally apertured as at 5. An alternate aperture or inlet passage 6 may also be formed in the wall 4. A second housing portion 7 of housing 1 has an annular, outwardly extending flange 8 at its open end, a generally circumferential wall 9 and a bottom or end wall 10. A clamp ring 11 clamps the flanges 3 and 8 together with a peripheral portion 12 of a diaphragm 13 therebetween. The diaphragm 13 thus divides housing 1 with the inlets 5, 6 communicating with the area on one side of diaphragm 13.

On the other side of diaphragm 13 there is mounted for contact with said last-named diaphragm side a pad 15 to which is secured, as at 16, a brake-operating rod or shaft 17. The shaft 17 extends outwardly of housing 1 through a centrally positioned aperture 18 in the wall 10 of housing portion 7. Suitable fasteners, such as that indicated at 19, are provided for attaching the housing 1 to support brackets and the like on the vehicle.

A series of fasteners such as the bolts 20 retain, within housing portion 7, a locking assembly body 21. The fasteners 20 retain the body 21 against flexible grommets 22, thus permitting some floating characteristic in the body 21 within the housing 7 except in the direction of diaphragm 13. The body 21 surrounds the rod 17 and has formed therein a well 23. A cap 24 seated over the open end of well 23 forms therewith a chamber A. An inlet 25 is formed in the end of cap 24 for communication with the chamber A on one side of a piston 26 reciprocal in chamber A. An opening 27 in the circumferential wall 9 of housing part 7 provides for passage thereinto of a conduit for communication with the inlet 25. It will be understood that suitable sealing means (not shown) may be associated with the opening 27 and with such conduit, when desired, without departing from the nature and scope of the invention.

Secured to the piston 26, on the opposite side thereof from the inlet 25, is a lock shaft 30. The opposite end of lock shaft 30 extends into a second well 31 where it is secured, as at 32, to a retainer cap 33. A threaded retraction member 34 has a head 35 within the cap 33 and extends outwardly through a closure plate 36, the latter having a threaded aperture 38 rotatably engaging member 34. A tool-engageable outer end 39 is formed on member 34 outwardly of plate 36 and an opening 40 is provided in the circumferential wall 9 of housing part 7 for engagement of portion 39 by a suitable tool. It will be understood that the opening 40 may be suitably sealed against the entry of dirt, dust and the like, when desired, without departing from the nature and scope of the invention. A spring 41 is active against plate 36 and the opposed annular surface of cap 33 to urge shaft 30 toward or in the direction of inlet 25.

The keeper shaft 30 is slidable in a passage 45 formed in body 21 and has, intermediate its ends, a tapered recess 46. The recess 46 has a bottom wall tapering inwardly in the direction of piston 26 and tapering also laterally, as may be best seen at 47 in FIGURE 2. The body 21 has a passage 48 formed therein for slidable reception of the intermediate portion 17a of shaft 17. The shaft portion 17a is generally rectilinear in cross-sectional configuration and has a pair of opposed grooves 17b mating with corresponding surfaces in the passage 48 in body 21. A portion of the shaft segment 17a extends into the passage 45 of body 21 for engagement with the shaft or locking members 30.

A spring 50 surrounds the shaft 17 within housing part 7 and has its opposite ends active against the inner surface of pad 15 and an opposed surface of body 21.

Figure 4:
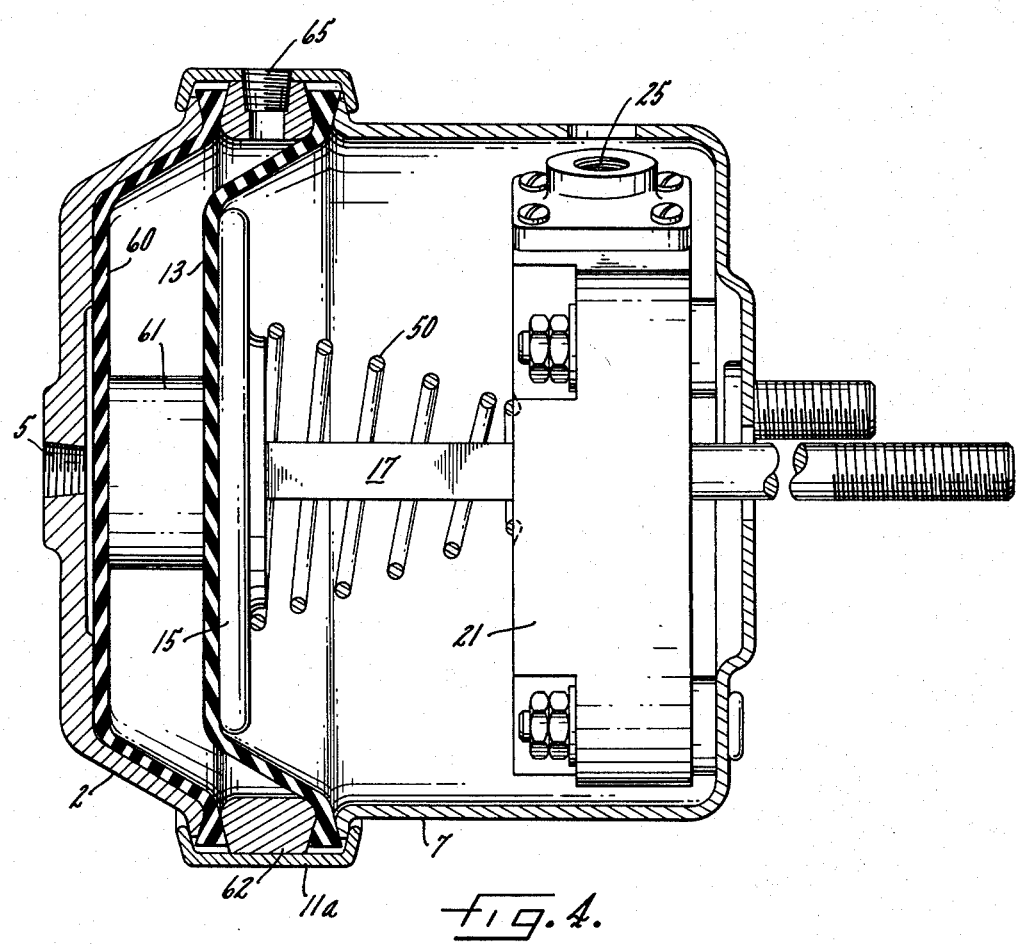
FIGURE 4 is a side elevation illustrating the invention employed with a variant form of brake actuator.

Referring now to FIGURE 4, many of the parts illustrated therein correspond to those previously described and are, accordingly, given identical numeral designations. In FIGURE 4, however, a second diaphragm 60 parallels the diaphragm 13 in spaced relationship therewith, a spacer means 61 being provided for this purpose. A spacer ring 62 is positioned between the opposed peripheral portions of diaphragms 13 and 60 and is clamped therebetween by the flanges of housing parts 2 and 7 which are in turn clamped by an expanded clamping ring 11a. A service pressure inlet 65 is formed in ring 62 and extends through ring 11a.

The use and operation of the invention are as follows:

It will be understood that conventional sources of fluid pressure are provided on vehicles and that suitable valves and conduits are provided for controlling and directing said fluid pressure in the operation of the vehicle brakes. For example, a service pressure reservoir would have associated therewith an application valve normally operated by the foot of the vehicle operator. When the operator desires to apply the brakes of the vehicle and operates such an application valve, service fluid pressure is delivered at inlet 5 in the structure of the invention as illustrated in FIGURE 1. The said pressure thereupon acts against diaphragm 13 and pad 15 to urge the brake-operating rod 17 outwardly of housing 1. The outer end 17c of rod 17 is threaded for engagement with suitable elements of the vehicle brake mechanism. Upon release of the application valve pressure is vented back therethrough and spring 50 returns pad 15 and diaphragm 13 to the position of FIGURE 1. In normal operation the foregoing sequence occurs and the body 21 and associated elements are inactive.

An emergency source of fluid pressure may be arranged to communicate with the inlet 6. In response to diminution of the above-described service pressure in the vehicle, suitable control valves may be automatically actuated to deliver emergency fluid pressure at inlet 6, thereby supplying pressure to the diaphragm 13 in precisely the manner above described with respect to inlet 5. Thus the brakes of the vehicle are automatically applied in response to loss of service pressure.

The inlet 25 is secured to a source of fluid pressure which may, for example, be an emergency pressure line. With pressure supplied to inlet 25, the piston 26 is held adjacent the innermost portion of chamber A and the recess 46 is held in alignment with the portion of rod 17 extending into passage 45 in body 21. Thus the shaft 17 is free to reciprocate through body 21 without interference of any kind so long as fluid pressure is present at inlet 25 and against piston 26 within chamber A. Should fluid pressure, however, be lost or directed away from inlet 25, the spring 41 is effective to move the shaft 30 toward inlet 25 and into the locking position illustrated, for example, in FIGURE 2. In such position the tapered recess 46, 47 is in contact with the tapered segment 17a of rod 17 and the rod 17 cannot be moved out of the brakes-on position. It will be observed that the tapered intermediate portion 17a moves into the body 21 when the rod 17 is moved into brakes-on position or to the right as the parts are shown in FIGURES 1 and 4.

In view of the fact that the taper 17a is tapered inwardly in the direction of the diaphragm 13, it will be realized that the rod 17 is free to move toward brakes-on position at all times, even when the lock shaft 30 is in locking position, but that the reverse is not true and that the rod 17 will be held in brakes-on position by lock shaft 30 and against withdrawal of rod 17 toward the release position illustrated in FIGURE 1.

Thus the vehicle operator is provided with a brake actuator of minimum size and weight effective for normal brake operation; an automatic application of the vehicle brakes upon loss of normal service pressure and an automatic locking of the brakes upon loss of emergency pressure. It will be understood that the vehicle operator may be provided with suitable valve and conduit arrangements whereby a controlled locking of the brakes is achieved, in that the operator may, with the brakes set either by normal or emergency pressure, intentionally lock the brakes by exhausting the pressure in chamber A through such valve and conduit arrangements.

Referring to FIGURE 4, it will be understood that the inlet 65 may similarly be secured to the source of service pressure controlled by an application valve and that delivery of fluid pressure at inlet 65 is effective to operate the diaphragm 30 in precisely the manner above described with respect to the structure of FIGURE 1. In such event the diaphragm 60 remains inactive in the position shown in FIGURE 4. If, on the other hand, fluid pressure fails or is unavailable at the inlet 65, emergency fluid pressure delivered at inlet 5 is effective to operate diaphragm 60 and, through the mediacy of spacer means 61, to operate the diaphragm 13, pad 15 and rod 17 to apply the brakes of the vehicle. The inlet 25, shown in FIGURE 4, is secured to a source of emergency pressure such as an emergency line. In relation to the structure of FIGURE 4, it will be understood further that the inlet 5 may be secured, by suitable conduits, to a protected tank of emergency pressure and that inlet 25 may be secured to a regular nonprotected emergency pressure source.

Figure 2:
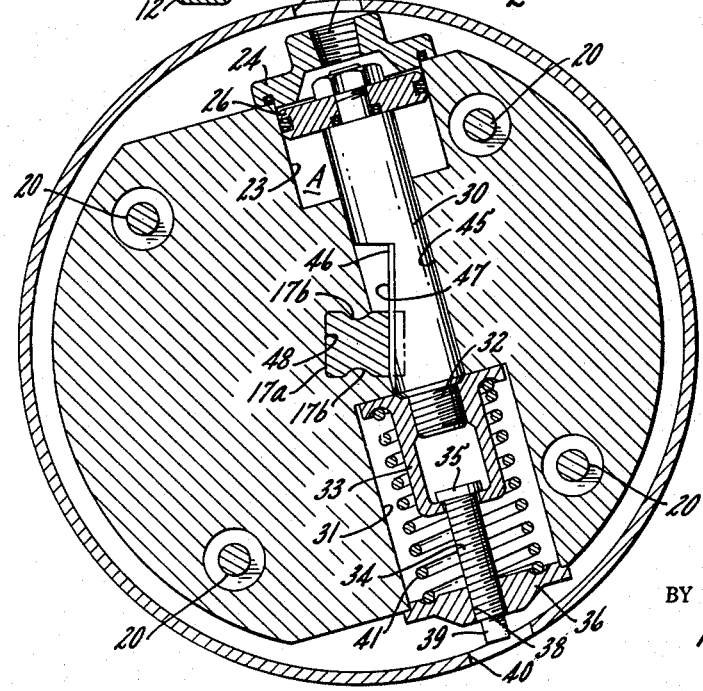
FIGURE 2 is a view taken on the line 2—2 of FIGURE 1.
Figure 3:
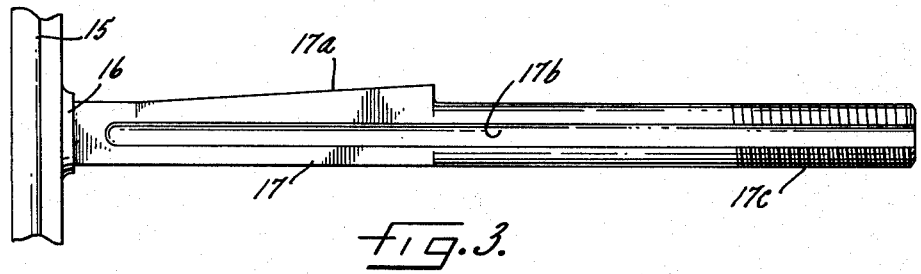
FIG. 3 is a detailed view illustrating a portion of the structure of the invention.

It will be further understood that the operation of the assembly illustrated in FIGURE 2 could be reversed and that the locking shaft 30 may, in such event, be moved into locking position in response to the presence of fluid pressure in chamber A on the opposite side from that previously disclosed. Such modification would require the provision of a fluid pressure inlet into chamber A on said opposite side of piston 26 and the positioning of spring 41 between piston 26 and cap 24. In such event, also, the retraction mechanism 34–39 could be reversed, as well as the associated valve-control means arranged to pressurize and exhaust chamber A both automatically and at the direction of the vehicle operator.

While the body 21 and associated elements are illustrated as employed with two forms of fluid pressure brake operators, it will be realized that the tapered shaft 17 could be substituted for the normal straight shaft employed in a variety of forms of actuators and the body 21, with its associated elements, could thus be inserted and utilized to lock said further forms of actuators.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention. The scope of the invention should, therefore, be limited only by the scope of the hereinafter appended claims.

There is claimed:

1. A brake actuator comprising a housing, a diaphragm dividing said housing, a fluid pressure inlet in said housing on one side of said diaphragm, an operating rod in contact with said diaphragm on the opposite side thereof from said inlet and extending outwardly from said housing and locking means for said rod, said means comprising a body surrounding said rod within said housing, a lock member movable in said body into and out of locking engagement with said rod, a fluid pressure inlet in said body positioned to deliver fluid pressure to said lock member to move the same.

2. In a brake actuator, a housing, an operating rod positioned in said housing and extending outwardly therefrom, fluid pressure responsive means in said housing for moving said rod in one direction and additional fluid pressure responsive means in said housing for locking said rod against movement in the opposite direction, said means including a body, a lock member slidable in said body, said rod extending through said body for engagement by said lock member, said rod and lock member having substantially parallel tapered surfaces for engagement one with the other when said lock member is in locking position.

3. In an actuator, a housing, an operating rod movable in said housing and extending outwardly therefrom, pressure-responsive means in said housing for moving said rod in an outward direction and means for locking said rod, said locking means including a separate body flexible carried within said housing, said body having a passage through which said rod extends, a locking member movable in said body for locking contact with said rod, and a second fluid pressure responsive means for moving said rod toward locking position.

4. In an actuator, a housing, an operating rod movable in said housing and extending outwardly therefrom, pressure-responsive means in said housing for moving said rod in an outward direction and means for locking said rod, said locking means including a separate body flexibly carried within said housing, said body having a passage through which said rod extends, a locking member movable in said body for locking contact with said rod, a second fluid pressure responsive means for moving said rod toward locking position, and yielding means for moving said locking member away from locking position.

5. In an actuator, a housing, an operating rod movable in said housing and extending outwardly therefrom, pressure-responsive means in said housing for moving said rod in an outward direction and means for locking said rod, said locking means including a separate body flexibly carried within said housing, said body having a passage through which said rod extends, a locking member movable in said body for locking contact with said rod, a second fluid pressure responsive means for moving said rod toward locking position, yielding means for moving said locking member away from locking position, and mechanical means engaging said locking member and rotatable to move said locking member against the action of said yielding means.

6. In an actuator, a housing, a brake-operating rod reciprocal in said housing and extending outwardly therefrom, pressure-responsive means in said housing for urging said rod toward and outwardly extending position, a tapered surface on said rod, a body surrounding said rod within said housing, said rod extending through a passage in said body, a locking member slidable laterally of said passage and having a surface positioned for engagement with the tapered surface of said rod within said body when said locking member is in locking position.

7. In an actuator, a housing, a brake-operating rod reciprocal in said housing and extending outwardly therefrom, pressure-responsive means in said housing for urging said rod toward an outwardly extending position, a tapered surface on said rod, a body surrounding said rod within said housing, said rod extending through a passage in said body, a locking member slidable laterally of said passage and having a surface positioned for engagement with the tapered surface of said rod within said body when said locking member is in locking position, and means on said body for urging said locking member toward and away from locking position.

8. An actuator comprising a housing, an actuating rod reciprocal in said housing and having a portion extendable outwardly therefrom, means in said housing for urging said rod in a direction outwardly therefrom, means carried within said housing for locking said rod in an outwardly extending position, said means including a separate body flexibly secured within said housing and surrounding said rod within said housing, a locking member movable within said body in a plane perpendicular to that of said rod for engaging said rod therewithin, and means in said body for moving said locking means toward and away from locking position, said last-named means including a spring urging said locking means in one direction and alternate means for moving said locking means in the other direction, said alternate means including a pressure-responsive member secured to said locking means and a manually operable member engageable with said locking means and extending outwardly of said body.

9. A brake actuator comprising a housing, a brake-operating rod reciprocal in said housing and extendable outwardly therefrom toward a brakes-on position, means in said housing for urging said rod toward brakes-on position, means within said housing for locking said rod against retrograde movement from said brakes-on position while permitting additional movement of said rod toward said brakes-on position, said last-named means including an element surrounding said rod and having a passage therethrough for reception of said rod therewithin, a locking member slidably movable in said element laterally of said rod, and means in said element for moving said locking member toward and away from locking position, said last-named means including pressure-responsive means urging said locking member away from locking position and yielding means urging said locking member toward locking position.

10. For use with an actuator of the type including a housing, an operating rod movable in said housing and extendable outwardly therefrom and fluid pressure responsive means for moving said rod, a body mounted in said housing, a passage through said body for reception of said rod reciprocally therein, a lock member movable laterally of said rod in said body for locking engagement with said rod, pressure-responsive means in said body for moving said lock member away from its locking position and yielding means in said body for moving said lock member toward its locking position, said rod and lock member having tapered surfaces engageable to lock said rod against movement in one direction while permitting movement of said rod in an opposite direction.

References Cited by the Examiner

UNITED STATES PATENTS

| | | | |
|---|---|---|---|
| 1,213,363 | 1/17 | Henry | 303—89 |
| 1,297,517 | 3/19 | Turner | 303—89 X |
| 2,118,890 | 5/38 | Maes | 92—18 |
| 2,632,425 | 3/53 | Grover | 92—28 |
| 2,845,902 | 8/58 | Anderson | 92—28 |

KARL J. ALBRECHT, *Acting Primary Examiner.*

FRED E. ENGELTHALER, RICHARD B. WILKINSON, *Examiners.*